Figure 4:
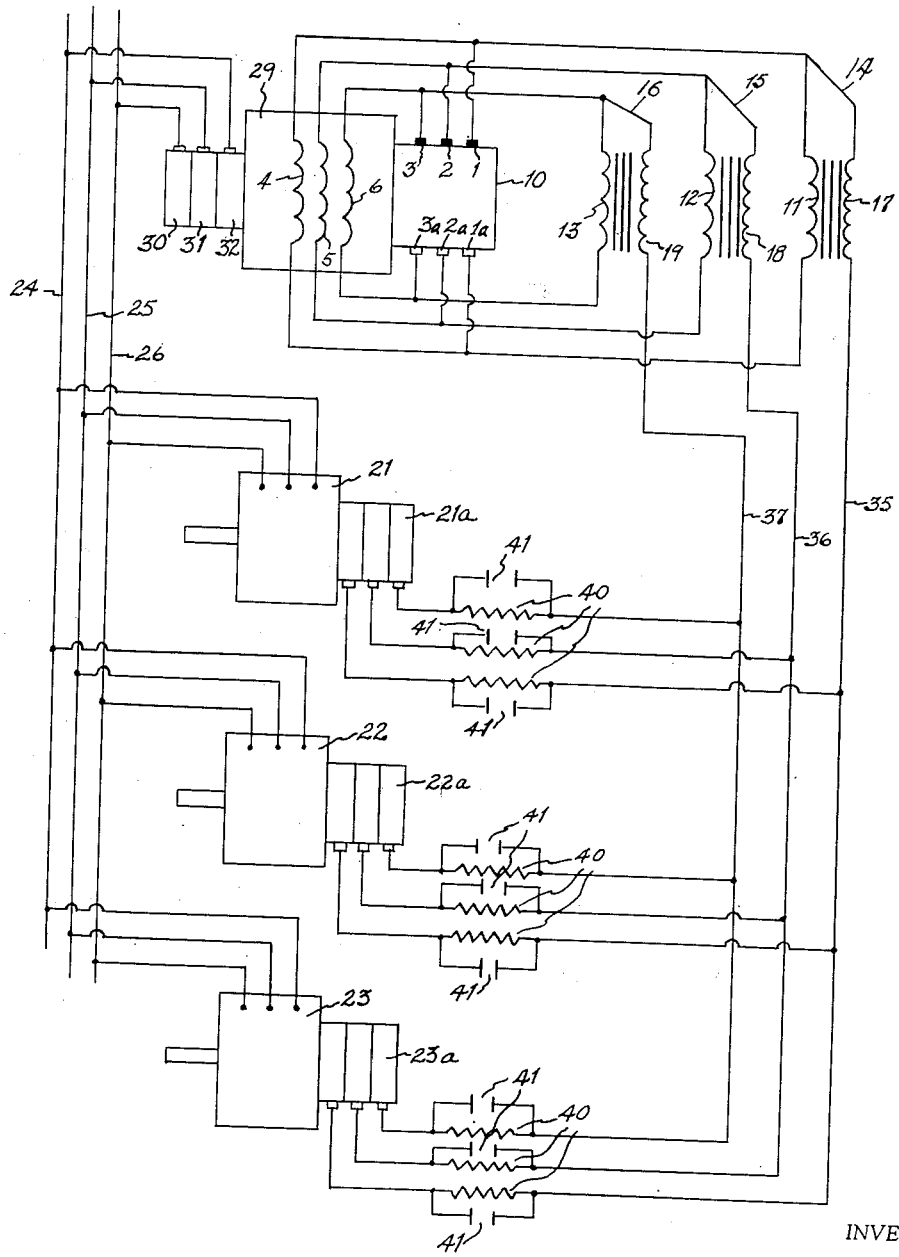

Oct. 23, 1956  J. P. LANDIS  2,768,341
SELF-SYNCHRONOUS DRIVE SYSTEM
Filed Oct. 28, 1954  2 Sheets-Sheet 1
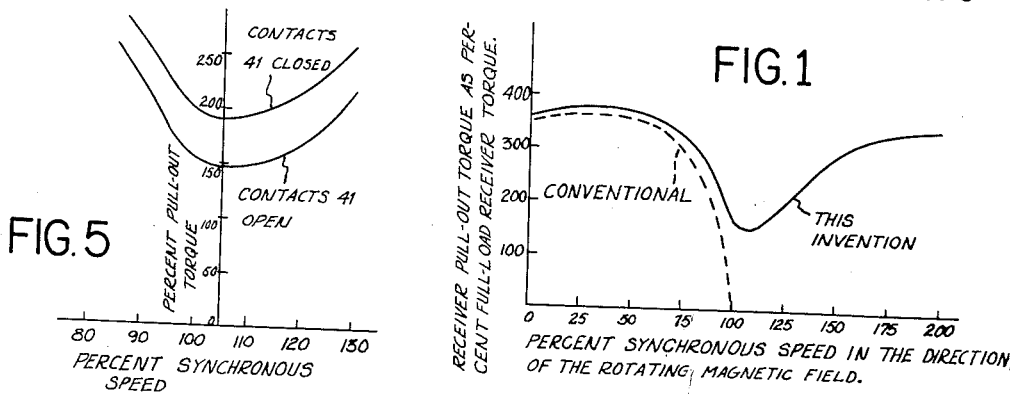
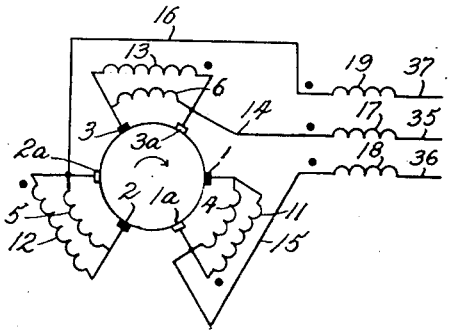
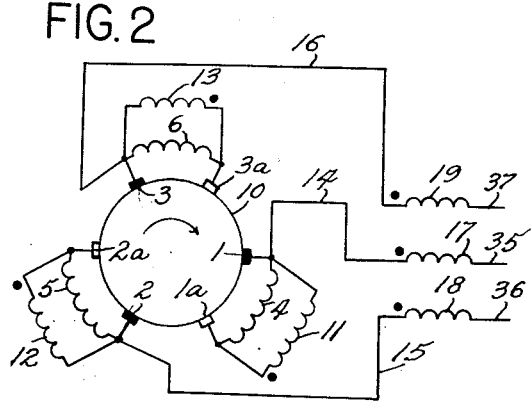
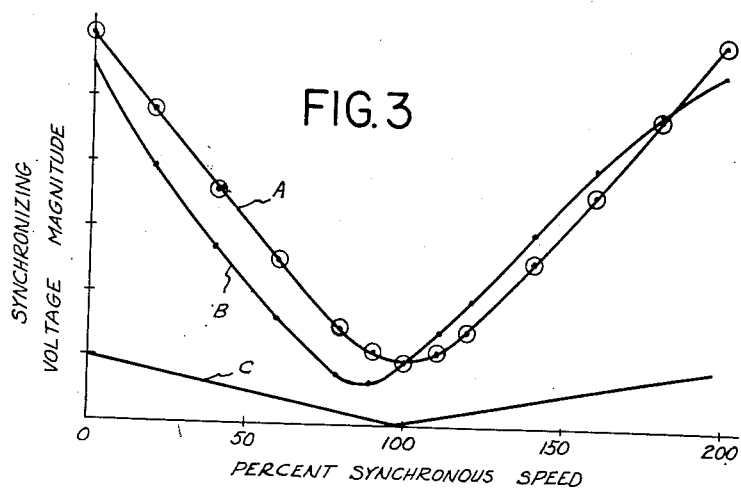
INVENTOR
JAMES P. LANDIS
BY
Harry J. McCauley
ATTORNEY Oct. 23, 1956

J. P. LANDIS 2,768,341

SELF-SYNCHRONOUS DRIVE SYSTEM

Filed Oct. 28, 1954

2 Sheets-Sheet 2

INVENTOR
JAMES P. LANDIS

BY  *Harry J. McCauley*

ATTORNEY

United States Patent Office 2,768,341
Patented Oct. 23, 1956

2,768,341

SELF-SYNCHRONOUS DRIVE SYSTEM

James P. Landis, Wilmington, Del., assignor to E. I. du Pont de Nemours and Company, Wilmington, Del., a corporation of Delaware Application October 28, 1954, Serial No. 465,251

2 Claims. (Cl. 318—44)

This invention relates to an electrical self-synchronous drive system and particularly to such a drive system employing a Schrage type motor as a transmitter and one or more wound-rotor induction motors as receivers.

The Schrage motor, manufactured under the designation ACA by the General Electric Company, is essentially a wound-rotor induction motor having additional electrical components built in to provide speed control. The built-in speed controlling apparatus consists of a commutator-type frequency changer for producing alternating voltages of adjustable frequency and a moving brush gear to adjust the magnitude of these voltages.

A primary object of this invention is to provide a self-synchronous system utilizing a Schrage motor as the transmitter, which at the same time may optionally be employed simultaneously as a motor also, and one or more wound-rotor type induction motors as receivers. Another object of this invention is to provide an electrical self-synchronous drive system which is capable of operating at improved efficiencies and power factors over conventional synchronous electrical systems. A further object of this invention is to provide an electrical self-synchronous drive system which is compact in space requirements and which utilizes commercially available components which are readily adapted to the service contemplated with only slight changes in construction. Another object of this invention is to provide an electrical drive system which has improved pull-out torque characteristics in the region of transmitter motor synchronous speed. Yet other objects of this invention are to provide a drive system which has an increased speed of response and flexibility to different service conditions over the characteristics displayed by conventional systems.

The manner in which these and other objects of this invention are obtained is set forth in detail in the description below, illustrated by the following drawings, relating to a transmitter and receivers having three secondary phases, in which:

Fig. 1 is a plot of receiver pull-out torque as percent of full-load receiver torque v. percent synchronous speed for a conventional wound-rotor type induction motor as transmitter (broken line representation) and a Schrage motor modified according to this invention as transmitter (full line representation), Fig. 2 is a schematic representation of a preferred embodiment of electrical circuit adapted to convert a conventional Schrage motor into a transmitter according to this invention, the direction of rotation of the Schrage motor and polarity markings of associated transformers being indicated, the positions of the brushes depicted being those assumed at a speed approximately halfway between synchronous speed and maximum speed, Fig. 2a is a schematic representation of another embodiment of electrical circuit according to this invention, which is similar in all respects to the circuit of Fig. 2 except as regards the points of connection of the transformer secondary windings with the Schrage motor secondary windings, Fig. 3 is a plot of the synchronizing voltage-speed characteristics for the circuits of Figs. 2 and 2a, curve A representing the characteristic obtained with the circuit of Fig. 2 and curve B representing the characteristic obtained with the circuit of Fig. 2a, Fig. 4 is one embodiment of a drive system according to this invention wherein a modified Schrage motor is utilized as the transmitter in the circuit connection shown in Fig. 2 (characteristic A of Fig. 3), and three wound-rotor type induction motors are the receivers, and Fig. 5 is a plot of percent pullout torque in the region of its minimum value v. percent synchronous speed for a receiver of the circuit of Fig. 4 under the conditions where the shunting contacts in the receiver circuits are closed and where the shunting contacts are open.

Generally, the objects of this invention are attained by utilizing a Schrage brush-shifting motor as the transmitter and one or more wound-rotor induction motors as receivers, providing individual transformers for each secondary phase of the transmitter with the primary winding of each transformer connected in shunt with the associated secondary winding of the transmitter and the secondary winding of each transformer connected in series with an individual synchronizing voltage supply lead running to the receivers, providing leads connecting adjacent individual commutator brushes on a common brush-carrying yoke of the transmitter in series with individual transformer secondary windings and their associated synchronizing voltage supply leads and energizing the secondary windings of the receivers from the synchronizing voltage supply leads and, in conventional manner, the primary windings of the receivers from an independent polyphase power source.

As hereinabove mentioned, a Schrage motor is essentially a wound-rotor induction motor having built-in appurtenances for achieving speed control, one conventional type motor being a 4-pole machine operating from a 60 cycle power source and having a speed range characteristic of 900 to 2700 R. P. M. and a slip range of +0.5 to −0.5. As is well known to persons skilled in the art, the speed of a wound-rotor type induction motor can be controlled by varying the voltage, with the frequency equal to slip frequency, which is impressed across the terminals of the secondary winding, this voltage being referred to in the art as the "adjusting voltage." This type of control is achieved in the Schrage type motor by incorporation, in the structure, of a commutator-type frequency changer for producing alternating voltages of slip frequency, and a moving brush gear to adjust the magnitude of these voltages, the Schrage motor having the primary winding located on the rotor and the secondary winding located on the stator, thus interrelating changes in frequency and voltage magnitude in a manner simplifying the problem of speed control in accordance with variations in either of these factors.

Utilization of the adjusting voltage derived from a conventtional Schrage motor as the voltage supply for the secondary windings of wound-rotor induction motor receivers is not practicable over the full speed range of the Schrage motor because of the relationship of receiver torque to synchronous speed depicted in broken line representation in Fig. 1, the torque delivered by the receiver falling off rapidly to zero as synchronous speed is approached. The torque capacity of a receiver motor thus is reduced in the synchronous speed region to a value where, from about 90% upwards, the delivered torque is insufficient to carry the load and the receiver drops inspeed to some value at which it can maintain the torque demand, thus falling out of step with the transmitter and operating out of synchronism therewith. This behavior of course renders the conventional Schrage motor unsuitable for use as a transmitter in a self-synchronous drive system throughout its entire speed range. The reason for this inadequacy is that the two commutator brushes of each pair in the frequency changer move more closely together as the speed of the Schrage motor approaches the synchronous level until, finally, both brushes contact the same commutator bar, or electrically interconnected commutator bars, under which condition the motor operates exactly like any other induction motor with a short-circuited secondary winding. At this point no synchronizing voltage is delivered by the Schrage motor and the speed of the receiver motor will be determined by the load on its shaft and the value of its secondary impedance, thus depriving the Schrage motor of its control status. Furthermore, under practical conditions of operation when the Schrage motor speed is increased to the level of synchronous speed or above, synchronism of the receiver is lost completely.

According to this invention, the secondary windings of the Schrage motor are provided with transformers arranged in an electrical circuit such as to derive a component of synchronizing voltage from adjacent commutator brushes of a common brush-carrying yoke, which is added to the output voltage of the transformers derived from the adjusting voltage supplied by the commutator brush pairs connected in conventional manner to the ends of the secondary windings of the Schrage motor but mounted on different yokes, so that the resultant synchronizing voltage is sufficient in magnitude to provide receiver pull-out, or maximum, torque throughout the 100% synchronous speed region, and above, as shown in the full line plot of Fig. 1. From the characteristic plotted it will be seen that the minimum value of torque delivered is very substantial and sufficient to prevent the receiver from falling out of step with the transmitter throughout the entire operating range.

Referring to Figs. 2 and 2a, the commutator of the Schrage motor, which is utilized as the transmitter, is indicated at 10 and the brushes 1, 2 and 3 carried by one brush-shifting yoke are shown in solid representation, while the brushes 1a, 2a and 3a carried by the other brush-shifting yoke are shown in unshaded representation. Brushes 1 and 1a, 2 and 2a, and 3 and 3a are connected to the ends of the individual secondary windings of the Schrage motor, denoted 4, 5 and 6, respectively, and the adjusting voltage hereinbefore referred to is that existing across these brush pairs. The elements so far described are parts of the standard Schrage motor in their conventional relationship.

According to this invention, separate electrical transformers are provided for each secondary phase of the Schrage motor, the transformers having their primary windings 11, 12 and 13 connected in shunt relationship with individual secondary windings of the Schrage motor and across individual brush pairs 1—1a, 2—2a and 3—3a, respectively. The transformer secondary windings 17, 18 and 19 are individually associated in electro-magnetic power-receiving relationship with the transformer primary windings 11, 12 and 13, respectively, and the secondary windings are each interposed in series connection with individual synchronizing voltage supply leads 35, 36 and 37, respectively, running to the receivers. Finally, electrical leads 14, 15 and 16 are provided connecting individual transformer secondary-synchronizing voltage supply lead combinations with adjacent commutator brushes carried by a preselected brush-carrying yoke of the Schrage motor, one such possible connection being indicated in Fig. 2, where connection is made with the brushes 1, 2 and 3 of one yoke, while another is indicated in Fig. 2a, where connection is made with the brushes 3a, 1a and 2a of the other yoke. It will be noted that in the connections taught the transformer secondary windings are in circuit with the leading brush of pairs connected across the Schrage motor secondary windings shunted by the associated transformer primary windings, or with the trailing brush of the brush pairs immediately leading these pairs of brushes, the terms "leading" and "trailing" referring to conditions of operation above synchronous speed. However, connection can be made to other brushes with some advantage over an unmodified Schrage motor, although without realization of the greatest possible benefits of this invention.

It will be understood that the Schrage motor provided with the transformers as hereinabove described produces voltages in each of the transformer primary windings 11, 12 and 13 which are dependent on the relative positions of the commutator brushes of each of the pairs 1—1a, 2—2a and 3—3a, and thus are equal in magnitude to the adjusting voltage of the conventional Schrage motor. However, the connections to adjacent brushes of a particular yoke yields another component of synchronizing voltage for delivery to the receivers which is constant in magnitude and thus adapted to maintain synchronism between the Schrage motor as transmitter and any wound-rotor induction motors in circuit as receivers.

The magnitudes of the voltage outputs of transmitters having each of the connections shown in Figs. 2 and 2a are represented graphically with respect to the speeds of the transmitters in Fig. 3, wherein it will be understood that the 100% synchronous speed point corresponds to the speed at which the rotating magnetic field revolves relative to the transmitter primary windings when these windings are supplied with polyphase currents of line frequency, usually 60 cycles. The plot C of adjusting voltage, e. g., that existing across brushes 1 and 1a, shows a linear decrease from maximum at the lowest design speed to zero slightly below synchronous speed, thereafter increasing linearly for speeds in excess of synchronous speed, this brush voltage relationship being exactly the same as that existent in the conventional Schrage motor, and which is responsible for the synchronization failure hereinabove referred to.

In Fig. 3 plot A represents the synchronizing voltage output obtained with the circuit of Fig. 2, whereas plot B represents the output with the circuit of Fig. 2a, each of these output patterns having particular advantages, depending upon the character of the load which is serviced by the receiver motors hereinafter described. It will be noted that, with either of the connections according to this invention, the voltage maintained across any pair of leads 35, 36 and 37 is appreciable and, even at the minimum of plot B, constitutes approximately 65% of the initial adjusting voltage of a Schrage motor at the lowest design speed. It will be understood that the voltage induced in the transformer secondary windings hereinbefore described is dependent on the turns ratio of the transformers, which permits the designer a flexibility in relating the synchronizing voltage supplied to the receivers at minimum and maximum speeds with respect to that at synchronous speed.

The choice of connection according to this invention in a particular use depends on the nature of the loads imposed on the system. Thus, the characteristic of curve A, which displays minimum voltage at 100% synchronous speed, is preferred where there are no sudden overloads on the system, for the reason that no-load and light-load currents are lower and construction costs are thereby reduced. On the other hand, where there are sudden overloads, the characteristic of curve B is preferred, since relatively higher synchronizing voltage output is obtained in the region of minimum pull-out torque (refer Fig. 1), thereby providing a somewhat greater reserve capacity for the accommodation of over-loads at speeds above synchronous, even though the design must be such as to operate at somewhat higher current levels at light loads than where operation is according to the characteristic of curve A. The circuit of Fig. 2a possesses a more limited regenerative capacity than the circuit of Fig. 2 and this may be disadvantageous in certain circumstances.

A typical self-synchronous drive system according to this invention is shown in Fig. 4 wherein the same reference numerals are employed throughout to designate components corresponding to those already described with reference to Fig. 2, thereby providing operation according to characteristic A of Fig. 3. In this system, power is supplied to the transmitter and the three wound-rotor induction type receiver motors indicated generally at 21, 22 and 23 through tapped connections with the 3-phase power lines 24, 25 and 26 which are usually, but not necessarily, a 60 cycle supply. The power input to the transmitter, indicated generally at 29, is through slip rings 30, 31 and 32 connected with the motor primary windings mounted on the rotor. To facilitate representation, the Schrage motor secondary windings 4, 5 and 6 are shown in a somewhat different arrangement than in the circuit diagram of Fig. 2; however, the circuit relationship and operation is exactly the same as that hereinbefore described. The output of transmitter 29 is supplied to the secondary windings of the receivers 21, 22 and 23 through brush and slip ring assemblies indicated generally at 21a, 22a and 23a, respectively, in the conventional manner via tapped connections with synchronizing voltage supply leads 35, 36 and 37. As indicated in Fig. 4, each of the tapped connections running from leads 35, 36 and 37 to the brushes of slip rings 21a, 22a and 23a may have interposed in circuit therewith shuntable resistors 40, each provided with shunting contacts 41, it being understood that the use of such resistors and shunts is optional and that, particularly where the receivers have secondary windings of relatively high resistance, the resistors may be dispensed with.

The size and cost of receiver motors 21, 22 and 23 is approximately proportional to the required pull-out torque in the neighborhood of synchronous speed. As mentioned with reference to Fig. 3, if the minimum voltage coincides with 100% synchronous speed, as is the case with the circuit having characteristic A, the receivers can be somewhat smaller than would be required for the same service with operation according to characteristic B. The voltage magnitude supplied to the secondaries of the receivers can be controlled to a considerable degree by the use of the resistors 40 and shunting contacts 41, contacts 41 being opened when reduced voltage supply to the receivers is required, as during normal operation with no over-load, and closed when the imposition of over-load is anticipated. Adjustment of this nature may be necessary in a typical operation wherein increased pull-out capability is required during the acceleration or deceleration of the drive. Under these conditions, contacts 41 can be interlocked with the control, e. g., the operator's pushbutton, to close and cut out resistors 40 when acceleration or deceleration is to be accomplished. It will also be understood that control of contacts 41 can be rendered completely automatic by providing suitable relay circuits in accordance with conventional practice, which are responsive to the power input to each receiver motor primary winding, thus under over-load conditions closing contacts 41 to accommodate the over-load.

The effect on pull-out torque with respect to speed for the situations where contacts 41 are closed and open is portrayed in Fig. 5, the appreciable benefit conferred by closure of contacts 41 being apparent under circumstances where increased pullout torque is necessary.

An additional benefit derived from resistors 40 is their inhibition of hunting or instability between a transmitter and its receivers at certain points in the speed range. Hunting, with the development of sustained oscillations interfering with synchronization between the individual units of the drive system, is a complicated phenomenon depending to an important degree on the damping characteristics of the loads carried by the receivers. If the loads are non-damping, the receivers display a greater tendency toward hunting the farther removed the operating speeds are from 100% synchronous speed over normal operating ranges. Accordingly, some resistance is desirable in the receiver secondary supply leads in these regions and resistors 40 are then preferably interposed by open-ing contacts 41. Thus, resistors 40 and their associated contacts 41 perform a dual function which is dependent on the operational environment for magnitude but in kind is practically generally desirable.

It should be mentioned that receivers 21, 22 and 23 are conventional in all respects except that, since in service they are required to accommodate non-standard voltages, they should be wound to suit the special requirements of the service at hand, such special winding usually being provided by motor vendors at a small premium charge.

It will be understood that, while this invention has been described with particular reference to a three-phase system, it is completely applicable to multiple-phase powering generally, individual circuit components being provided for each phase involved in exactly the same manner as has been described in detail for the three-phase system. A particular advantage of the system provided by this invention is that the transmitter may simultaneously be employed as a motor, thus affording an additional driving connection, which is often extremely convenient, especially in congested plant locations.

From the foregoing it will be apparent that my invention is capable of extensive modification within the skill of the art without departure from the essential spirit of the invention, wherefor it is intended to be limited only by the following claims.

What is claimed is:

1. An electrical self-synchronous system comprising the combination of a Schrage brush-shifting motor provided with brush-carrying yokes as transmitter and at least one wound-rotor induction motor as receiver, individual transformer primary windings electrically connected in shunt relationship with individual secondary windings of said Schrage motor, individual transformer secondary windings disposed in electromagnetic power-receiving relationship with individual ones of said transformer primary windings, electrical leads connecting each said individual transformer secondary winding in preselected phase relationship with an individual secondary winding of said receiver, electrical conductors in circuit with single individual brushes on a preselected one of said brush-carrying yokes of said Schrage motor and in series connection with individual ones of said transformer secondary windings and the electrical leads connected therewith, an independent polyphase power source, and power supply conductors connected in preselected phase relationship between said independent polyphase power source and the primary winding of said receiver.

2. An electrical self-synchronous system according to claim 1 wherein said electrical leads connecting each said individual transformer secondary winding in preselected phase relationship with an individual secondary winding of said receiver are provided with individual shuntable resistors for temporary overload accommodation.

References Cited in the file of this patent
FOREIGN PATENTS
290,329   Great Britain _____ May 1, 1928